(12) United States Patent
Sheftel

(10) Patent No.: US 10,217,245 B2
(45) Date of Patent: Feb. 26, 2019

(54) METHOD AND SYSTEM FOR CHROMA KEYING

(71) Applicant: Blueprint Reality Inc., Vancouver (CA)

(72) Inventor: Benjamin James Sheftel, Vancouver (CA)

(73) Assignee: Blueprint Reality Inc., Vancouver (CA)

( * ) Notice: Subject to any disclaimer, the term of this patent is extended or adjusted under 35 U.S.C. 154(b) by 152 days.

(21) Appl. No.: 15/623,879

(22) Filed: Jun. 15, 2017

(65) Prior Publication Data

US 2018/0365864 A1 Dec. 20, 2018

(51) Int. Cl.
*H04N 9/75* (2006.01)
*G06T 11/00* (2006.01)
*G06F 3/0481* (2013.01)
*G06F 3/0486* (2013.01)
*G06F 3/0484* (2013.01)

(52) U.S. Cl.
CPC ............ *G06T 11/001* (2013.01); *H04N 9/75* (2013.01); *G06F 3/0486* (2013.01); *G06F 3/04812* (2013.01); *G06F 3/04842* (2013.01); *G06T 2200/24* (2013.01)

(58) Field of Classification Search
CPC ..................................................... H04N 9/75
See application file for complete search history.

(56) References Cited

U.S. PATENT DOCUMENTS

2011/0008017 A1* 1/2011 Gausereide .......... G11B 27/034
386/280
2015/0380051 A1* 12/2015 Segal ................... G11B 27/031
386/282

OTHER PUBLICATIONS

Xu et al. "Deep Image Matting." 2017. CoRR, Computer Vision and Pattern Recognition. arXiv:1703.03872 [cs.CV].

* cited by examiner

*Primary Examiner* — Jitesh Patel
(74) *Attorney, Agent, or Firm* — Damien G. Loveland

(57) ABSTRACT

When chroma keying, the colors to be removed from a video are first selected from an image of the background set using an eyedropper. The colors of the pixels that are selected form part of the chroma key, which also includes a tolerance range based on the colors. Colors to be removed are selected by clicking, or clicking and dragging the eyedropper. Portions of the image that are keyed are removed after each selection. The chroma key is expanded as more areas of the image are selected, until all the entire background set is selected. Chroma keying is carried out using the HSB (hue, saturation, brightness) convention.

21 Claims, 5 Drawing Sheets

METHOD AND SYSTEM FOR CHROMA KEYING

TECHNICAL FIELD

This application relates to a method and system for chroma keying. In particular, it relates to calibration of the key color parameter ranges derived from an image of the background displayed on an intuitive interface.

BACKGROUND

Chroma keying is used in real time and post-processed video production for the removal of a green screen background from presenters or actors so that their images can be superimposed onto other scenes.

Chroma keying is generally performed through the comparison of RGB (red, green and blue) values for a specified "key" color with the color of each pixel in the captured video frame. By excluding or reducing the display of the pixels that closely match the key color, or making them transparent, the presenters or actors can be isolated from the background set and rendered onto other graphics. Typically, the background set is a solid green or blue evenly lit surface.

Determining the "key" color for chroma keying, which is the central color of typically a small range of colors, is often unintuitive for the majority of video production users. The determination of an additional threshold parameter, is also unintuitive for the majority of video production users. The problems stem from the fact that the way the colors are represented is not conceptually straightforward, and users therefore have to rely on trial and error. The fields for selecting the key color and calibration are represented as sliders, if at all, in many existing solutions, which compounds the issue of unintuitive representation with controls that are difficult to use.

This background information is provided to reveal information believed by the applicant to be of possible relevance to the present invention. No admission is necessarily intended, nor should be construed, that any of the preceding information constitutes prior art against the present invention.

SUMMARY OF INVENTION

Chroma keying using the present invention involves calibration of the key color by using ranges of three parameters, such as hue, saturation and brightness, which are derived from an image of the background displayed on an intuitive interface. The key color ranges are selected with an eyedropper by clicking, or clicking and dragging, on the image, and color keying of the image is updated on the screen after each selection. The key is represented in data by one window in each of the three parameter ranges, and optionally by multiple windows per parameter. The key is adapted to incorporate additionally selected colors as they are selected, by increasing the range of colors that it represents. Colors of the background that are modified by the presence of a subject can also be added to the chroma key during a verification phase.

The present invention results in a simple and accurate keying process for users without requiring any in-depth training. The invention may be used in computer-altered video production, for example, in mixed-reality applications.

Disclosed herein is a method for chroma keying comprising the steps of: receiving, by a processor, a selection of a pixel of a screen; determining, by the processor, three values which define color ("coordinates") for a portion of an image displayed by the pixel; defining, by the processor, a window for each of the three values, each window extending in both directions from its corresponding value by a corresponding range vector; defining, by the processor, a chroma key that includes all coordinates that lie within all three windows; identifying, by the processor, all pixels in the image that display colors within the chroma key; receiving, by the processor, a selection of an unidentified pixel; calculating, by the processor, a further three values which define color for the unidentified pixel; expanding, by the processor, at least one of the windows so that the windows collectively include the further three values; redefining, by the processor, the chroma key to include all coordinates that lie within all three windows after the step of expanding; and identifying, by the processor, all unidentified pixels in the image that display colors within the redefined chroma key.

Some embodiments further include repeating the receiving of a selection of an unidentified pixel and all subsequent steps until all pixels within the image are identified and thereby keyed.

In some embodiments, when a window is expanded, the expanded window is further expanded by an additional tolerance. In some embodiments, the identifying steps include redrawing the corresponding pixels as transparent. Some embodiments further include receiving the image in a feed from a camera; and displaying the image on the screen.

Some embodiments further include displaying on the screen an eyedropper button; receiving a selection of the eyedropper via activation of the eyedropper button; displaying on the screen a cursor corresponding to a position of the eyedropper; and receiving a click of the eyedropper; wherein said selection of a pixel occurs when the eyedropper is clicked, and the pixel that is selected is defined by the position of the eyedropper. Some embodiments further include displaying a color block on the screen having a color that corresponds to the chroma key.

In some embodiments, the selection of a pixel or of an unidentified pixel is received via a dragging of the eyedropper.

In some embodiments, the selection of a pixel or unidentified pixel includes a selection of multiple, further pixels or unidentified pixels, each having three values which define their color; and the windows that are expanded are expanded so that the windows collectively include the three values which define color for all the selected pixels or selected unidentified pixels.

Some embodiments further include receiving, by the processor, a selection of another unidentified pixel; calculating, by the processor, an additional three values which define color for the other unidentified pixel; determining, by the processor, that one of the additional three values lies outside its corresponding window by more than a threshold amount; defining, by the processor, an additional window for the value that lies outside its corresponding window by more than the threshold amount, wherein the additional window extends in both directions from a central value by another, corresponding range vector; further redefining, by the processor, the chroma key to include all coordinates that lie within all of the additional window and two of said three other windows after the step of expanding; and identifying, by the processor, all unidentified pixels in the image that display colors within the further redefined chroma key.

Some embodiments further include receiving the image in a feed from a camera, wherein the image is of a background set; displaying the image on the screen; and after all pixels in the image have been identified: receiving in the feed a video of a subject in the background set; displaying the video on the screen with the chroma key applied, such that the colors defined by the chroma key are not displayed; receiving, by the processor, a selection of an extra pixel having a color that is to be added to the chroma key, said extra pixel displaying a portion of the background and having suffered a change in at least one of its three values that define color to outside of its corresponding window due to the subject being in the background set; further expanding, by the processor, at least one of the windows to include said changed value or values; further redefining, by the processor, the chroma key to include all coordinates that lie within all three windows after the step of further expanding; and removing from the display, all pixels in the image that are within the further redefined chroma key.

In some embodiments, the three values are HSB (hue, saturation, brightness) values; the further three values are further HSB values; and the determining step comprises: obtaining RGB (red, green, blue) values for the selected pixel; and converting the RGB values to the HSB values. Some embodiments further include defining, by the processor, the HSB values as three central values, wherein each window extends in both directions from its central value by its corresponding range vector. In some embodiments, the expanding step includes: redefining the central value for each window that is expanded; and increasing the range vector for each window that is expanded. In some embodiments, the three values, which define color for the portion of the image displayed by the pixel, are obtained by bilinear filtering.

Also disclosed is a system for chroma keying comprising: a background set; a camera focused on the background set; a processor configured to receive an image in a feed from the camera; and a screen on which the image is displayed under control of the processor; wherein the processor is configured to: receive a selection of a pixel in the image; determine three values which define color ("coordinates") for a portion of an image displayed by the pixel; define a window for each of the three values, each window extending in both directions from its corresponding value by a corresponding range vector; define a chroma key that includes all coordinates that lie within all three windows; identify all pixels in the image that display colors within the chroma key; receive a selection of an unidentified pixel; calculate a further three values which define color for the unidentified pixel; expand at least one of the windows so that the windows collectively include the further three values; redefine the chroma key to include all coordinates that lie within all three windows after the step of expanding; and identify all unidentified pixels in the image that display colors within the redefined chroma key.

Further disclosed is a non-transitory computer readable medium for chroma keying comprising computer-readable instructions, which, when executed by a processor, cause the processor to: receive a selection of a pixel of a screen; determine three values which define color ("coordinates") for a portion of an image displayed by the pixel; define a window for each of the three values, each window extending in both directions from its corresponding value by a corresponding range vector; define a chroma key that includes all coordinates that lie within all three windows; identify all pixels in the image that display colors within the chroma key; receive a selection of an unidentified pixel; calculate a further three values which define color for the unidentified pixel; expand at least one of the windows so that the windows collectively include the further three values; redefine the chroma key to include all coordinates that lie within all three windows after the step of expanding; and identify all unidentified pixels in the image that display colors within the redefined chroma key.

BRIEF DESCRIPTION OF DRAWINGS

The following drawings illustrate embodiments of the invention, which should not be construed as restricting the scope of the invention in any way.

DESCRIPTION

A. Glossary

Figure 1:
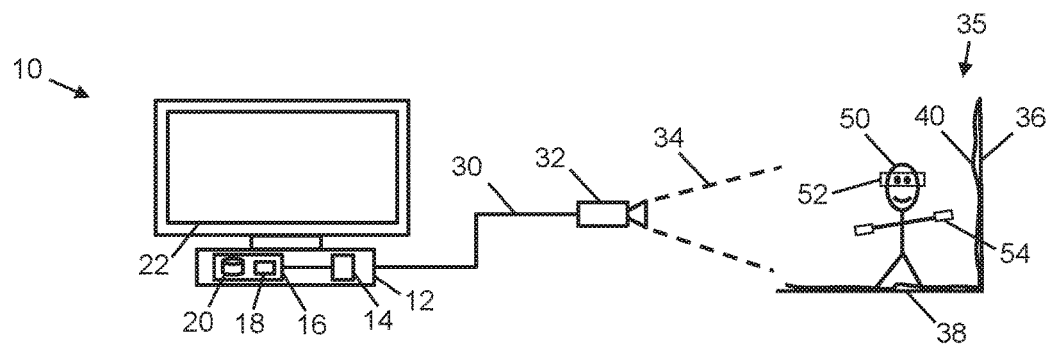
FIG. 1 is a schematic diagram of a system for chroma keying, according to an embodiment of the present invention.

The term "chroma keying" refers to keying specifically for an algorithm that uses color to identify areas of images. If may, for example, refer to the removal of a background from a video that has a subject in the foreground. A color range in the video is made transparent, so that when the video is overlaid on another scene or video, the subject appears to be in the other scene or video.

The term "HSB" (hue, saturation, brightness) refers to a set of three numerical values that represent color in cylindrical coordinates. The set of three values may be referred to as coordinates or a set of coordinates in the 3-dimensional cylindrical coordinate system. It is sometimes known as HSV, where V is used for value. In the cylinder, the angle around the central vertical axis corresponds to hue. The distance from the axis corresponds to saturation, where the color content is zero at the axis and 100% at the circumference. Distance up the vertical axis corresponds to the brightness, such that when the distance is zero, all colors represented are black, and when the distance is maximum, the hue with its particular saturation is at its brightest. Hue starts with red at 0°, passes through green at 120° and blue at 240°, and then wraps back to red at 360°. The central vertical axis comprises the neutral, achromatic, or gray colors, ranging from black at the bottom to white at the top. Hue can also be represented as a number from 0-1 instead of an angle.

The term "key" or "key data" refers to a set collection of values that are stored and/or passed to an algorithm that is used to identify specific areas of images, such as a green screen. In general, the identification of the specific areas can be done using any suitable parameter and is not restricted to the use of color.

The term "keying" refers to the determination of the values of a key. With regards to this disclosure, keying a pixel refers to keying the color of a pixel. This is a step during keying that sets or modifies the key data to ensure that the specific color of the pixel in question is removed from everywhere on the screen through background removal. Likewise, a color may be keyed. The more generic term "calibration" may be used for all of the determination steps in the keying process, which includes supplying data, directly or indirectly.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "RGB" (red, green, blue) refers to a set of three numerical values, usually in the range 0-255, corresponding respectively to the amount of red, green and blue light output by a pixel in an electronic display.

The term "transparency" in computer graphics refers to a fourth parameter that is used to represent a pixel's value, beyond the three RGB or HSB parameters, for example. It represents the translucency of a pixel, from completely transparent to completely opaque, and defines the extent to which an underlying pixel is visible through the pixel in question. Transparency is determined by the algorithm the key is used with, and is not sampled from the source image. With chroma keying algorithm described herein, identified pixels are given a transparency value of 0, meaning fully transparent.

B. System

Referring to FIG. 1, there is shown an exemplary system 10 for chroma keying. The system 10 includes or interacts with a user computing device 12, which may be a desktop, laptop or tablet computer, for example, or any other electronic device that provides the necessary equivalent functionality to fulfill the requirements of the invention. The user device 12 includes one or more processors 14 which are operably connected to computer readable memory 16 included in the device. The system 10 includes computer readable instructions 18 (e.g. an application) stored in the memory 16 and computer readable data 20, also stored in the memory. Computer readable instructions may be broken down into blocks of code or modules. The memory 16 may be divided into one or more constituent memories, of the same or different types. The user device 12 includes a display screen 22, operably connected to the processor(s) 14. The display screen 22 may be a traditional screen, a touch screen, a projector, an electronic ink display or any other technological device for displaying information.

The user device 12 is connected via a wired or wireless connection 30 to a camera 32. The camera 32 is directed such that its field of view 34 captures a background set 35. In this example, the background set 35 includes a wall 36 and floor 38, both covered with a green cloth 40. A subject 50, wearing virtual reality goggles 52 and holding controls 54, is present in the background set 35.

The scene viewed by the camera 32 is displayed on the display screen 22 of the user device 12. When the viewed scene is of the background set 35 only, a user of the user device 12 can click on portions of the screen 22 to identify colors that are to be keyed.

Figure 2:
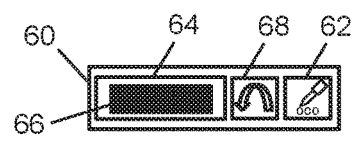
FIG. 2 shows a partial screen shot of a user interface used for chroma keying, according to an embodiment of the present invention.

Referring to FIG. 2, a set of controls 60 of a portion of an exemplary user interface is shown, which is displayed on the screen 22 at the same time as the background set is displayed. The controls include an eyedropper 62, a key color display 64 and an undo or reset button 68. The controls may be translucent and displaceable if they are displayed over the image of the camera feed.

The eyedropper button 62, when selected or otherwise activated, displays on display screen 22 an eyedropper cursor superimposed on the display of the background set 35. The user can move the eyedropper cursor around, click it and drag it. When the user clicks the eyedropper cursor, one or more pixels within the cursor are selected. In one embodiment, the selection may be of the single pixel which is at or closest to the center of the eyedropper cursor. When the user clicks and drags the eyedropper cursor, multiple pixels are selected. In one embodiment, all the pixels that are traced over by the center of the cursor are selected. The cursor may be the same color as the background pixel that it is hovering over or selecting.

The undo or reset button 62 cancels the selections of the pixels that have already been made, either in reverse order in which they were selected, or all in one go, depending on the embodiment.

The key color display 64 displays a color block 66 corresponding to the color that represents the chroma key data. In some embodiments the displayed color is that of the median values of the key windows.

Figure 3:
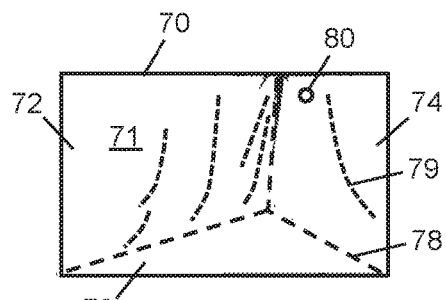
FIG. 3 shows an eyedropper cursor on a screenshot of a set background, which is viewed by a camera, according to an embodiment of the present invention.

FIG. 3 shows a screenshot 70 of a background set covered with a cloth 71. The cloth 71 is hung to form wall covering portions 72 and 74 and floor covering portion 76. The transitions 78 between the walls and the floor are shown by long-dashed lines. Folds 79 in the cloth 71 are shown by short-dashed lines. Differences in shading exist across the view of the background set due to it being non-uniformly lit, due to the set having surfaces facing different directions and due to the folds 79 in the cloth 71. Also shown in the screenshot 70 is an eyedropper cursor 80, which is displayed as a result of the user selecting the eyedropper button 62.

Figure 4:
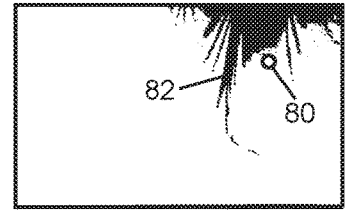
FIG. 4 shows a screenshot of the set background of FIG. 3 after it has been partially keyed.

FIG. 4 shows the same view as in FIG. 3 after the user has clicked the eyedropper, when the eyedropper cursor was located in the position shown in FIG. 3. The result of clicking the eyedropper is that the color at the center of the cursor and all similar colors within a narrow range of the central color are keyed, wherever they appear on the screen 22, resulting in removed portion 82, which is removed from the image in screenshot 70. The portion is removed by making the pixels transparent, to reveal whatever is being displayed behind the image, such as a virtual scene or another, underlying color. The colors that are now keyed, and all colors that are the same as these will be removed from a video of the background set, whenever a subject is present or absent. At this point, however, the background is only partially keyed, and so the user has moved the cursor 80 to a new position.

Figure 5:
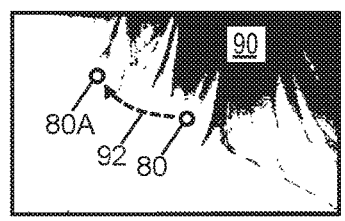
FIG. 5 shows a screenshot of the set background of FIG. 3 after it has been further keyed, and shows how the eyedropper cursor can be dragged across the display.

FIG. 5 shows the same view as in FIG. 4 after the user has clicked the eyedropper, when the eyedropper cursor was located in the position shown in FIG. 4. The result of clicking the eyedropper is that the additional color at the center of the cursor and all similar colors within a narrow range of it are keyed, resulting in a larger removed portion 90. These additional colors are now keyed. At this point, however, the background is still only partially keyed, and so the user has moved the eyedropper cursor 80 to a new position. The user is about to click on the eyedropper and drag it to position 80A, effectively selecting a range of colors under the path 92 of the cursor 80 as it is dragged to position 80A.

Figure 6:
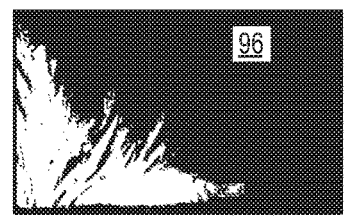
FIG. 6 shows a screenshot of the set background of FIG. 3 after it has been mostly keyed.

FIG. 6 shows the result of clicking and dragging the eyedropper as described in relation to FIG. 5. It can be seen that most of the background set is now removed 96 as it has been keyed. The extra portion of the screen that is keyed is removed gradually as the eyedropper is dragged. In this sense, the eyedropping can be considered to be passthrough eyedropping. Passthrough in this case refers to the ability to continue selecting colors while allowing the user to immediately see which pixels are being keyed out elsewhere on the screen. The use of passthrough eyedropping reduces the context, i.e. the amount of information that needs to be acquired and/or maintained in order to complete the task.

Figure 7:
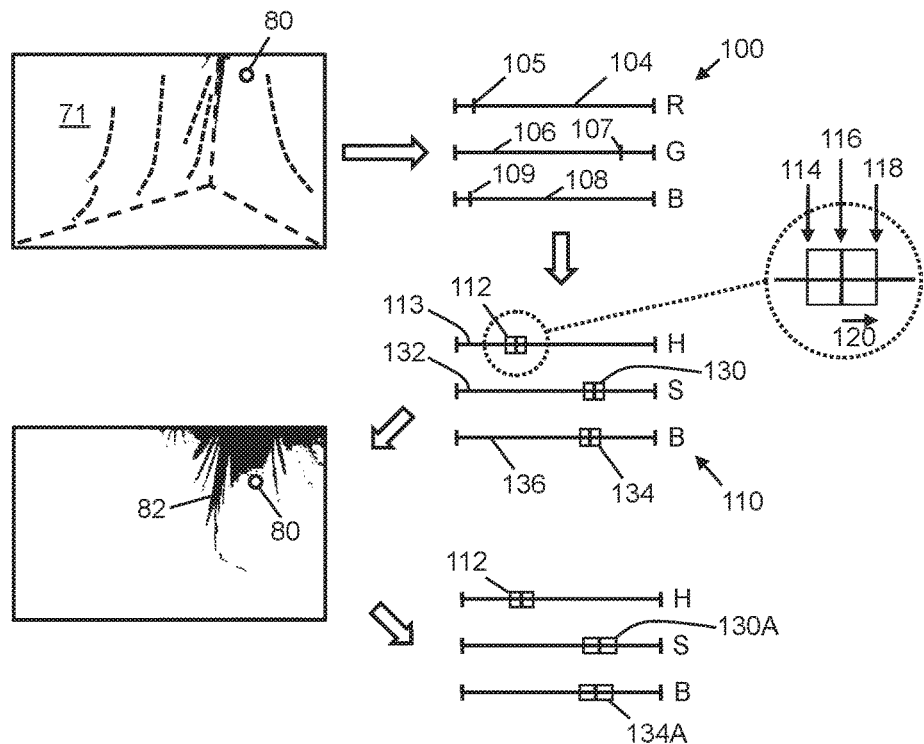
FIG. 7 is a schematic diagram showing the steps of chroma keying according to an embodiment of the present invention.

Referring to FIG. 7, the main steps of the chroma keying process are shown. Starting from the display of the empty background set as in FIG. 3, in particular the cloth 71, the eyedropper is clicked when its cursor 80 is at the position shown. As a result of this click, the system obtains the RGB values 100 for the pixel at the center of the eyedropper cursor. Here, the values are represented as points on number lines 104, 106, 108 corresponding to red (R), green (G) and blue (B) values respectively. Here, the R value is represented by point 105 on the line 104; the G value is represented by point 107 on line 106; and the B value by point 109 on line 108. The three RGB points may be referred to as a set of coordinates.

After the RGB values have been determined, they are converted to HSB (hue, saturation, brightness) numbers. The RGB values are converted to HSB values with a 1:1 relationship and they are here represented as points on a set of three number lines 110. The three HSB points may be referred to as a set of coordinates. As part of the calibration process, the single value points are expanded to cover small ranges to account for small differences in the lighting and/or color of the background set. Here, the value of the hue has been expanded to window 112 on the hue (H) number line 113. A close-up of the window 112 shows that the window ranges from a lower value 114, through a central value 116, to an upper value 118. The central value 116 is midway between the lower 114 and upper 118 values. The half-width 120 of the window can be considered to be the range, and all values of hue that lie within the central value 116 plus or minus the range 120 will be keyed if they also fall within the saturation (S) and brightness (B) windows. The saturation window 130 is shown on number line 132, and the brightness window 134 is shown on number line 136. The central values and ranges may be considered to represent a single, 3D "window" in HSB space, which encompasses all coordinates of the key.

After the HSB windows have been calculated, the display on the screen is analyzed to determine which of the pixels lie within all three windows and which do not. The colors that lie within all three of the HSB windows are considered to be keyed. To do the analysis, the RGB values for each pixel of the display are first converted to HSB numbers. The pixels that have colors that lie within all three windows are then made transparent or otherwise identified, as shown by portion 82 of the display.

The process then continues with the user clicking the eyedropper at another location on the screen, which has not yet been keyed. The system then determines the HSB numbers for the newly selected pixel. At least one of the HSB values for the newly selected pixel will lie outside the previously calculated HSB windows, otherwise the pixel would already be keyed. In this example, the newly selected pixel has an H value within the H window 112, and S and B values that lie outside of the S window 130 and B window 134 respectively. The system therefore expands the S and B windows to encompass the new S and B numbers, resulting in expanded S window 130A and B window 134A. The central values of the windows may be adjusted so that they remain within the center of each window, and the range vector is increased. The windows 112, 130A and 134A represent the chroma keying data set. The broader range of colors within the three HSB windows can then be made transparent or otherwise identified on the screen.

C. Method

Figure 8:
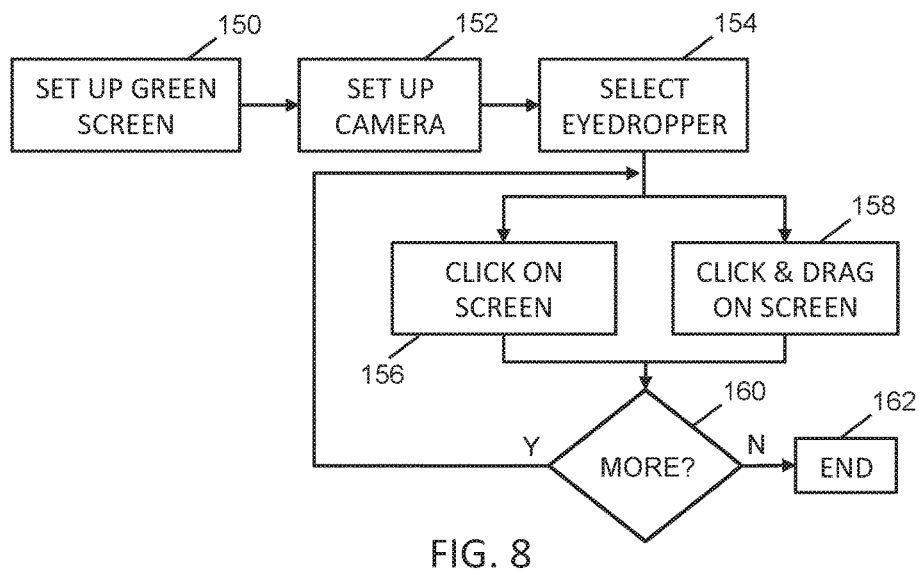
FIG. 8 is a flowchart showing the steps a user takes in chroma keying, according to an embodiment of the present invention.

Referring to FIG. 8, a flowchart shows the steps a user takes in chroma keying. In step 150, the user sets up the green screen in the background set. Hotspots of light generally produce variance in saturation, shadows generally produce variance in brightness, and material variance generally causes variance in hue. The best chance of producing effective keying is to aim to have an even background hue with contrasting subject hues, since saturation and brightness are less controllable. This ensures that other materials are left untouched as they will fall outside the narrow hue window.

In step 152, the user sets up the camera 32, ensuring that the field of view is completely filled with the green screen. The feed from the camera is displayed on the screen 22 of the user device 12. In step 154, the user selects the eyedropper button 62, and either clicks the eyedropper in step 156 or clicks and drags the eyedropper in step 158. By clicking, or clicking and dragging the eyedropper, the user selects colors displayed on the display screen 22 that need to be keyed. In step 160, if there are more areas on the screen 22 that need to be keyed, the user reverts back to step 156 or 158 to click on more areas of the screen. Returning to step 160, if there are no more areas on the screen 22 to be keyed, then the process ends at step 162.

The result of the process is that the user has implicitly provided the three central HSB values and a range vector that define the HSB windows, which are stored as data 20 that is later used in the chroma keying process. The central HSB values and range vector are stored as numbers in the range of 0-1, with an accuracy of 2 decimal places, for example. In other embodiments, different ranges and/or different accuracies (e.g. 6 decimal places) can be used.

Figure 9:
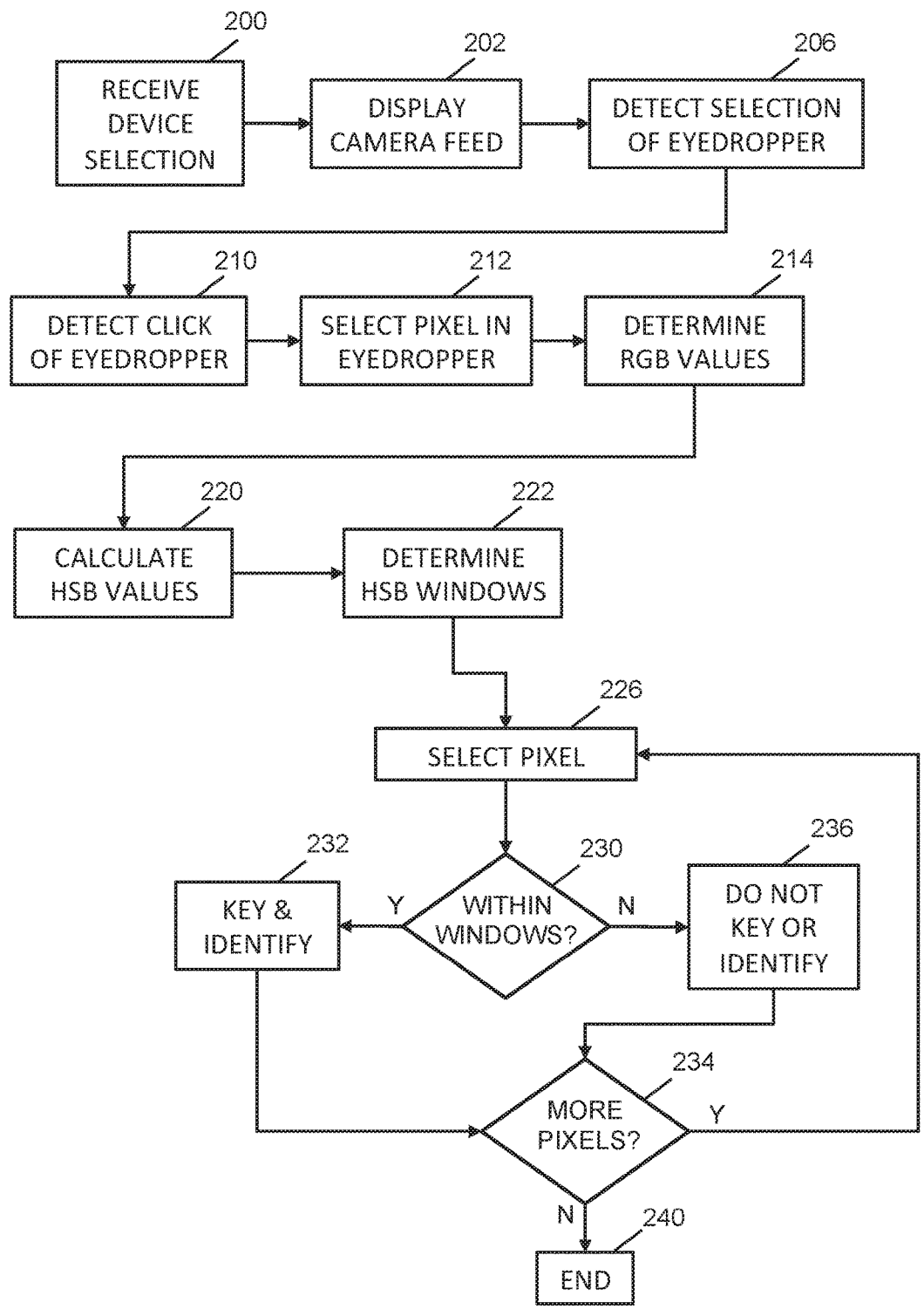
FIG. 9 is a flowchart of the initial steps the system takes when chroma keying, according to an embodiment of the present invention.

Referring to FIG. 9, the initial steps the system 10 makes are shown. In step 200, the system receives the selection of a device, in particular this is the camera which is connected to the user computing device and which is viewing the background set. In step 202, the system displays an image of the camera feed on the screen of the user computing device.

In step 206, the system detects the selection by the user of the eyedropper button 62. In step 210, the system detects a click of the eyedropper while the eyedropper tool is selected. In step 212, the system determines which pixel has been selected by the click of the eyedropper. In one embodiment, this is the pixel closest to the center of the eyedropper cursor. The system then in step 214 obtains the RGB values for the selected pixel.

The system then, in step 220, calculates the HSB values corresponding to the RGB values for the pixel. The HSB values calculated are the initial, central values of the HSB windows, and represent the central color. For example, for a typical green screen, the values of HSB may be (0.48, 0.86, 0.65). The system then calculates the HSB windows in step 222 by applying the range vector to the central values. The range vector may be, for example, (0.05, 0.05, 0.05), i.e. 0.05 for each of the three parameters in the HSB representation. In other embodiments, different ranges may be used, and each of the hue, saturation and brightness values may have a different range. In some embodiments, the initial range vector may be set to (0,0,0), however, this will make the calibration process a little more involved for the user, as a smaller area of the display will be keyed on the first click of the eyedropper.

All the pixels in the image on the screen are then processed with the key, in its current state, to test whether they have been keyed or not. In step 226, the system selects a pixel, and determines, in step 230, whether it has HSB values that are all within the three HSB windows that were calculated in step 222. If the pixel has HSB values that are each within their corresponding window, then the pixel is keyed and identified as keyed in step 232. To identify the pixel as keyed, it is removed by redrawing it as transparent. Removal of a pixel can also be referred to as making it invisible, or hiding the color of it. If, however, the pixel has at least one value of its HSB values outside of the corresponding window, then that pixel is not identified as keyed, in step 236. Instead, it is left displaying the portion of the camera feed which it was initially displaying. After a pixel has been tested, and either keyed or left as it is, then the system determines in step 234 whether there are more pixels to be processed. If so, the process returns to step 226, in which another pixel is selected for testing. If, in step 234, there are no more pixels to be tested, then the process ends in step 240.

Figure 10:
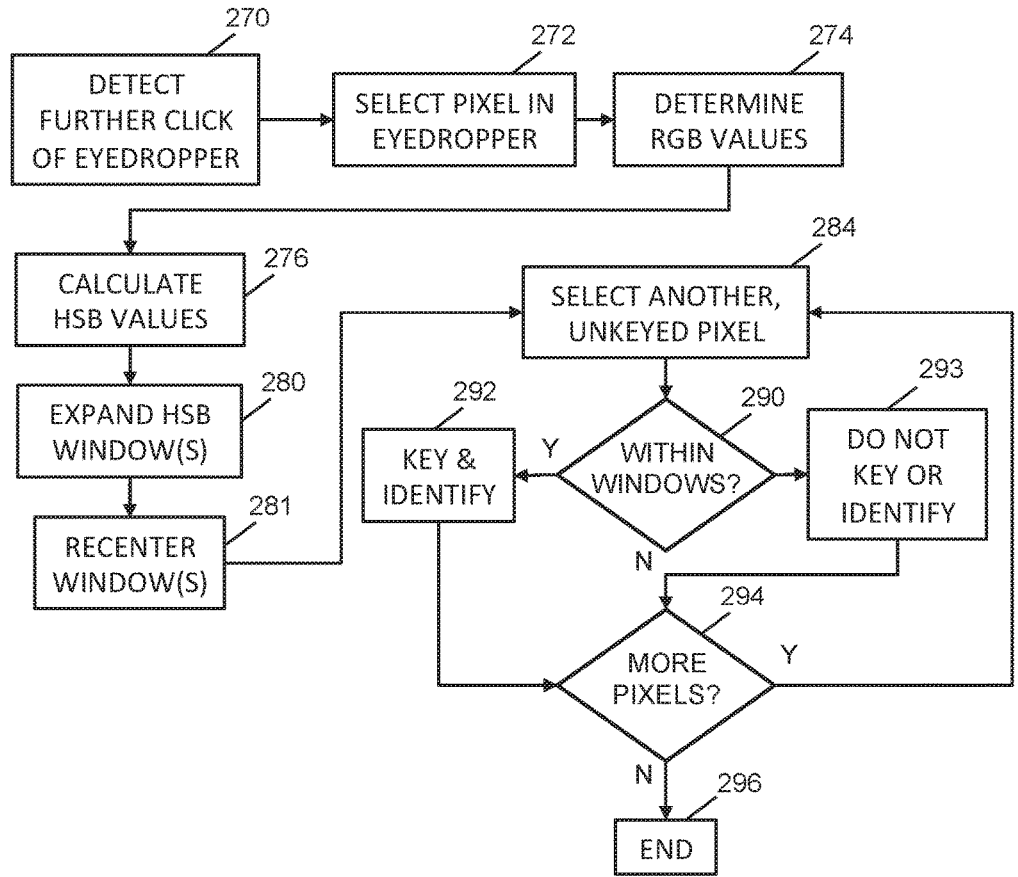
FIG. 10 is a flowchart of subsequent steps the system takes when chroma keying, according to an embodiment of the present invention.

FIG. 10 is a flowchart of subsequent steps the system takes when chroma keying, for example after the initial click of the eyedropper. In step 270, the system detects a further click of the eyedropper on a pixel that has not been keyed. In step 272, the system determines which pixel the eyedropper has selected. In step 274, the system obtains the RGB values of the selected pixel. In step 276, the system converts the RGB values of the pixel to HSB values, and then calculates which of the HSB values is/are outside the existing window. Because at least one of the three HSB values is outside its corresponding window, the windows are expanded in step 280, where necessary, to encompass the HSB values of the pixel. In effect the chroma key data is redefined to include coordinates of all previously keyed colors and currently selected colors. The windows may be extended further than the out-of-window values of the newly selected pixel.

In step 281, the windows are recentered if necessary, i.e. the central value of each window is adjusted to lie midway between the upper and lower extremes of the window. As the values of hue wrap back to 0 from 1, the recentering of the hue window may result in moving it from one side of the scale to the other, e.g. changing its value from close to 0 to close to 1.

All the pixels (or all the unkeyed pixels) in the image on the screen are then processed with the key, in its current, modified state, to test whether they have been keyed or not. In step 284, the system selects a pixel. If, in step 290, the pixel has HSB values that are all within of the corresponding expanded windows, then the pixel is removed in step 292, by making it transparent. If the pixel has at least one of its HSB values that is outside its corresponding window, then the pixel is left displaying the original camera feed and is not identified as keyed, in step 293. In step 294, the system determines if there are more pixels to be tested, and, if so, the process reverts to step 284. If not, then the process ends in step 296. The process may be repeated from step 270 until all desired colors have been incorporated into the chroma key.

Figure 11:
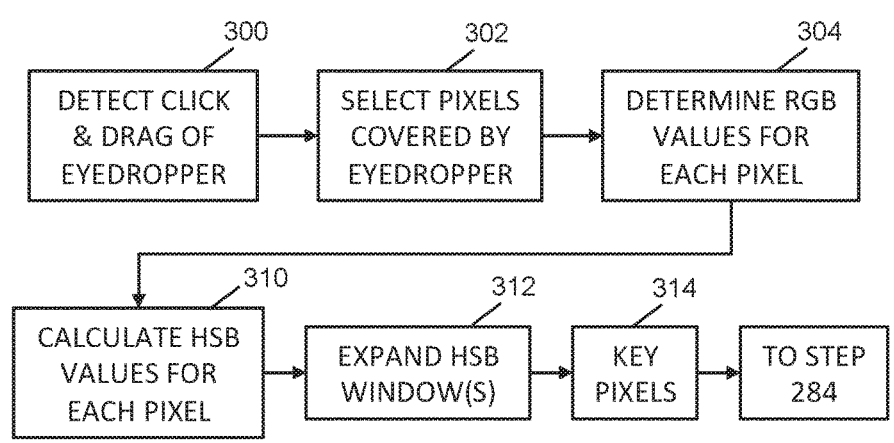
FIG. 11 is a flowchart of the steps the system takes when the eyedropper is dragged, according to an embodiment of the present invention.

FIG. 11 is a flowchart of the steps the system takes when the eyedropper is dragged. In step 300, the system detects a click and drag of the eyedropper. In step 302, the system selects the pixels that are traced over by the cursor of the eyedropper. In step 304, the system determines the RGB values for each of the pixels that are selected. In step 310, the HSB values are calculated for each of the pixels that are selected. In step 312, the HSB windows are expanded, where necessary, in order to encompass all of the selected pixels. The windows are recentered in step 313, if necessary. In step 314, the selected pixels are keyed. The process then continues with step 284 of FIG. 10.

Figure 12:
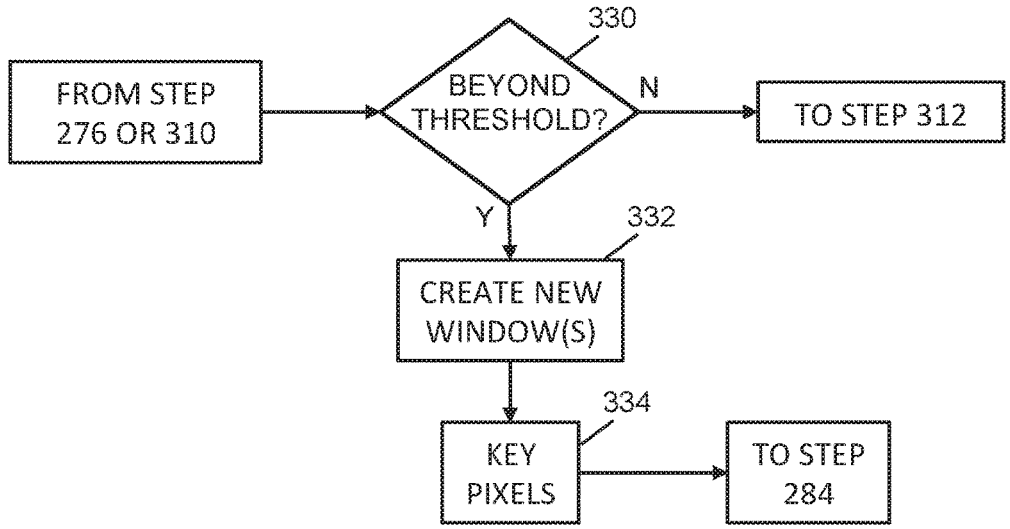
FIG. 12 is a flowchart of the steps the system takes to define multiple chroma key windows for the same parameter, according to an embodiment of the present invention.

FIG. 12 is a flowchart of the steps an alternate embodiment of the system takes, to define multiple chroma key windows for the same parameter. This embodiment is used if, for example, the green screen is made up of two distinct colors. In this situation, using a single hue window for the keying would likely eliminate a significant part of the subject as well as the background. To avoid this eventuality, in this example, there can be two windows on the hue line, one for each of the distinct colors. To make the system more versatile, there can be two or more windows on each of the hue, saturation, or brightness lines, i.e. a set of windows for each distinct color.

The system starts from step 276 (FIG. 10) or step 310 (FIG. 11), in which at least a first selection and keying of pixels has been made, which results in the creation of one window for each of the HSB values. Also, a further click, or click and drag has been made in order to select one or more pixels that need to be keyed. In step 330, the system determines, for each of the HSB values of the newly selected pixel(s), whether the value is outside of the existing window (or windows, if there are already multiple windows for the corresponding HSB parameter) by more than a predefined threshold amount. If not, then the process continues with step 312 (FIG. 11), because the expansion of the existing window will not make it so wide that it will eliminate too many colors from the video. If, in step 330, one of the values is greater than a threshold distance from the corresponding existing window, then another window is created, with a corresponding range, in step 332. This process is performed for each of the HSB values, so that there could be two (or more) windows on each of the three HSB number lines. After the new windows have been created, the pixels with HSB values that are now encompassed by the new windows are keyed, in step 334. The process then continues with step 284 (FIG. 10).

In some cases, the expansion of a window may cause the modified window to meet or overlap another window. If this occurs, the two windows can be merged together into a new window spanning the range of both windows combined.

Figure 13:
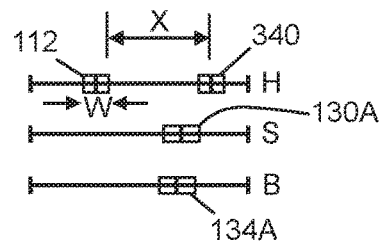
FIG. 13 is a schematic representation of multiple chroma key windows for the hue parameter.

FIG. 13 is a schematic representation of two chroma key windows for the hue parameter. In this example, the new window 340 on the hue line has a central value that is a distance X from the upper value of the existing window 112, with width W. The threshold may be determined, for example, by the condition that if X>0.5 W, then a new window is created. Other threshold conditions may be used in other embodiments, and the conditions may be either dependent on or independent of the current width of the existing window.

Figure 14:
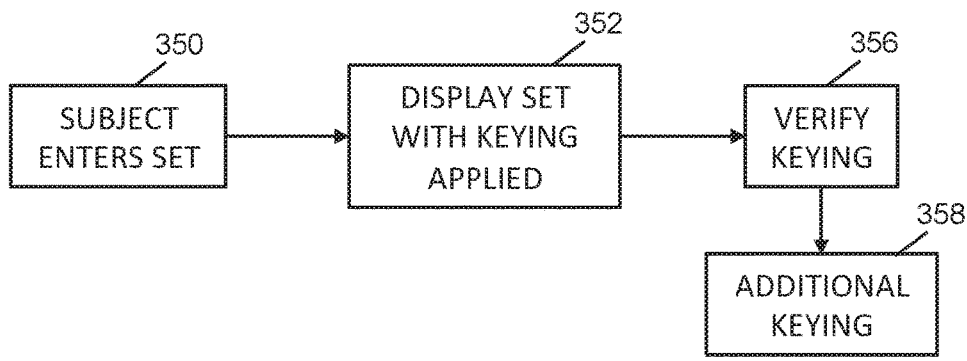
FIG. 14 is a flowchart of a process undertaken to verify and adjust the chroma keying.

Referring to FIG. 14, a flowchart of the process undertaken to verify the calibration is shown. After the whole of the background has been keyed, a subject enters the set, in step 350. The camera feed of the set with the subject is displayed on the screen 22, with the chroma keying applied, in step 352. The user can observe the effectiveness of the keying with the subject present. There may be areas of the background, which have become visible on the screen 22, due, for example, to a change in lighting of the background caused by the presence of the subject. This can be verified in step 356, and can be repeated with the subject in different positions in the set or in different postures. If areas of the background have become visible, then the eyedropper button can be selected and the areas of the background that have reappeared can be keyed in step 358. After the additional keying, the calibration can be rechecked by observing the camera feed of the set with the subject in and moving around.

After the calibration process has been completed, then, at run-time, the following process occurs. Firstly, the camera sampled RGB color is converted to HSB for each pixel. Secondly, the system checks whether any of the sampled values lie outside the 3D "window" in HSB space, which is defined by the central color plus or minus the range vector. Thirdly, the display of those pixels that are inside the 3D windows are canceled (or made invisible or transparent) to allow corresponding pixels of a virtual background to be displayed instead. Note that this process also occurs simultaneously with the calibration process.

D. Variations

While the present embodiment describes the best presently contemplated mode of carrying out the subject matter disclosed and claimed herein, other embodiments are possible.

The central color at the eyedropper may be selected with bilinear filtering, meaning that if the cursor lies between four pixels, it blends them proportionally to an average value. A "multi-tap" sample option is also possible, which captures multiple underlying color samples for expediency. In other embodiments, all the pixels within the eyedropper cursor may be selected and processed in sequence when the eyedropper is clicked. In some embodiments, all the pixels that are traced over by the whole of the cursor are selected when the eyedropper cursor is clicked and dragged.

While HSB has been used as the convention upon which the chroma keying is based, it is envisaged that other conventions may be used. In comparison to the RGB convention, the use of HSB, while indirect, better represents the targeted features of real-world keying, which are to identify areas of a particular material (e.g. green screen). The use of RGB for keying, while possible, often results in the removal of parts of the subject. Use of the HSB convention allows for more a more precise window for the hue value while allowing saturation and value to vary more widely with lighting.

In some embodiments, the key data is created, stored, and applied on a per-pixel basis rather than a global setting. The calibration process in this scenario can be run on each pixel independently in parallel, making it a good candidate for GPU hardware acceleration. Given the high volume of data (millions of pixels per image frame), the calibration process here is done without user input. The process is similar to the user-driven process, except that each pixel is being selected automatically for its corresponding calibration through a sampling process, which reads and processes the incoming images on the fly for a set period of time, e.g. 10 seconds.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Steps in the flowcharts may be performed in a different order, other steps may be added, or one or more may be removed without altering the main function of the system. Steps shown to occur in parallel may be changed to occur sequentially and vice versa. Flowcharts from different figures may be combined in different ways. Screen shots may show more or less than the examples given herein. All parameters and configurations described herein are examples only and actual values of such depend on the specific embodiment. Accordingly, the scope of the invention is to be construed in accordance with the substance defined by the following claims.

The invention claimed is:

1. A method for chroma keying comprising the steps of:
receiving, by a processor, a selection of a pixel of a screen;
determining, by the processor, three values which define color ("coordinates") for a portion of an image displayed by the pixel;
defining, by the processor, a window for each of the three values, each window extending in both directions from its corresponding value by a corresponding range vector;
defining, by the processor, a chroma key that includes all coordinates that lie within all three windows;
identifying, by the processor, all pixels in the image that display colors within the chroma key;
receiving, by the processor, a selection of an unidentified pixel;
calculating, by the processor, a further three values which define color for the unidentified pixel;
expanding, by the processor, at least one of the windows so that the windows collectively include the further three values;
redefining, by the processor, the chroma key to include all coordinates that lie within all three windows after the step of expanding; and
identifying, by the processor, all unidentified pixels in the image that display colors within the redefined chroma key.

2. The method of claim 1, further comprising:
repeating the receiving of a selection of an unidentified pixel and all subsequent steps until all pixels within the image are identified and thereby keyed.

3. The method of claim 1, wherein when a window is expanded, the expanded window is further expanded by an additional tolerance.

4. The method of claim 1, wherein the identifying steps include redrawing the corresponding pixels as transparent.

5. The method of claim 1, further comprising:
receiving the image in a feed from a camera; and
displaying the image on the screen.

6. The method of claim 1, further comprising:
displaying on the screen an eyedropper button;
receiving a selection of the eyedropper via activation of the eyedropper button;
displaying on the screen a cursor corresponding to a position of the eyedropper; and
receiving a click of the eyedropper;
wherein said selection of a pixel occurs when the eyedropper is clicked, and the pixel that is selected is defined by the position of the eyedropper.

7. The method of claim 6, comprising displaying a color block on the screen having a color that corresponds to the chroma key.

8. The method of claim 6, wherein the selection of a pixel or of an unidentified pixel is received via a dragging of the eyedropper.

9. The method of claim 8, wherein:
the selection of a pixel or unidentified pixel includes a selection of multiple, further pixels or unidentified pixels, each having three values which define their color; and
the windows that are expanded are expanded so that the windows collectively include the three values which define color for all the selected pixels or selected unidentified pixels.

10. The method of claim 1, further comprising:
receiving, by the processor, a selection of another unidentified pixel;
calculating, by the processor, an additional three values which define color for the other unidentified pixel;
determining, by the processor, that one of the additional three values lies outside its corresponding window by more than a threshold amount;
defining, by the processor, an additional window for the value that lies outside its corresponding window by more than the threshold amount, wherein the additional window extends in both directions from a central value by another, corresponding range vector;
further redefining, by the processor, the chroma key to include all coordinates that lie within all of the additional window and two of said three other windows after the step of expanding; and
identifying, by the processor, all unidentified pixels in the image that display colors within the further redefined chroma key.

11. The method of claim 2, further comprising:
receiving the image in a feed from a camera, wherein the image is of a background set;
displaying the image on the screen; and
after all pixels in the image have been identified:
receiving in the feed a video of a subject in the background set;
displaying the video on the screen with the chroma key applied, such that the colors defined by the chroma key are not displayed;
receiving, by the processor, a selection of an extra pixel having a color that is to be added to the chroma key, said extra pixel displaying a portion of the background and having suffered a change in at least one of its three values that define color to outside of its corresponding window due to the subject being in the background set;
further expanding, by the processor, at least one of the windows to include said changed value or values;
further redefining, by the processor, the chroma key to include all coordinates that lie within all three windows after the step of further expanding; and
removing from the display, all pixels in the image that are within the further redefined chroma key.

12. The method of claim 1, wherein:
the three values are HSB (hue, saturation, brightness) values;
the further three values are further HSB values; and
the determining step comprises:
obtaining RGB (red, green, blue) values for the selected pixel; and
converting the RGB values to the HSB values.

13. The method of claim 12, further comprising defining, by the processor, the HSB values as three central values, wherein each window extends in both directions from its central value by its corresponding range vector.

14. The method of claim 13, wherein the expanding step includes:
redefining the central value for each window that is expanded; and
increasing the range vector for each window that is expanded.

15. The method of claim 1, wherein the three values, which define color for the portion of the image displayed by the pixel, are obtained by bilinear filtering.

16. A system for chroma keying comprising:
a background set;
a camera focused on the background set;
a processor configured to receive an image in a feed from the camera; and
a screen on which the image is displayed under control of the processor;
wherein the processor is configured to:
receive a selection of a pixel in the image;
determine three values which define color ("coordinates") for a portion of an image displayed by the pixel;
define a window for each of the three values, each window extending in both directions from its corresponding value by a corresponding range vector;
define a chroma key that includes all coordinates that lie within all three windows;
identify all pixels in the image that display colors within the chroma key;
receive a selection of an unidentified pixel;
calculate a further three values which define color for the unidentified pixel;
expand at least one of the windows so that the windows collectively include the further three values;
redefine the chroma key to include all coordinates that lie within all three windows after the step of expanding; and
identify all unidentified pixels in the image that display colors within the redefined chroma key.

17. The system of claim 16, wherein:
the three values are HSB (hue, saturation, brightness) values;
the further three values are further HSB values; and
the processor determines said three values by:
obtaining RGB (red, green, blue) values for the selected pixel; and
converting the RGB values to the HSB values.

18. The system of claim 16, wherein the processor is further configured to repeat the receiving of a selection of an unidentified pixel and all subsequent steps until all pixels within the image are identified and thereby keyed.

19. The system of claim 16, wherein the processor is further configured to:
display on the screen an eyedropper button;
receive a selection of the eyedropper via activation of the button;
display on the screen a cursor corresponding to a position of the eyedropper; and
receive a click of the eyedropper;
wherein said selection of a pixel occurs when the eyedropper is clicked, and the pixel that is selected is defined by the position of the eyedropper.

20. The system of claim 16, wherein the processor is further configured to receive the selection of a pixel or an unidentified pixel via a dragging of the eyedropper.

21. A non-transitory computer readable medium for chroma keying comprising computer-readable instructions, which, when executed by a processor, cause the processor to:
receive a selection of a pixel of a screen;
determine three values which define color ("coordinates") for a portion of an image displayed by the pixel;
define a window for each of the three values, each window extending in both directions from its corresponding value by a corresponding range vector;
define a chroma key that includes all coordinates that lie within all three windows;
identify all pixels in the image that display colors within the chroma key;
receive a selection of an unidentified pixel;
calculate a further three values which define color for the unidentified pixel;
expand at least one of the windows so that the windows collectively include the further three values;
redefine the chroma key to include all coordinates that lie within all three windows after the step of expanding; and
identify all unidentified pixels in the image that display colors within the redefined chroma key.

* * * * *